April 15, 1958 T. MALEWSKI 2,831,097
HEATING ROLLER ASSEMBLY FOR LAMINATING, EMBOSSING
AND PRINTING MACHINES
Filed Feb. 23, 1956
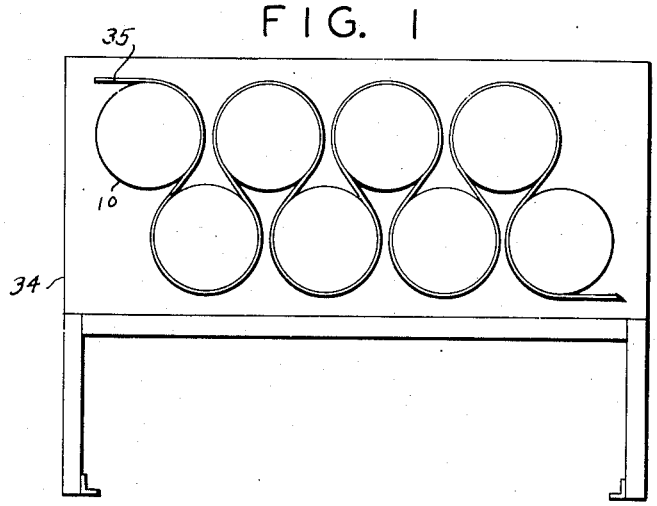
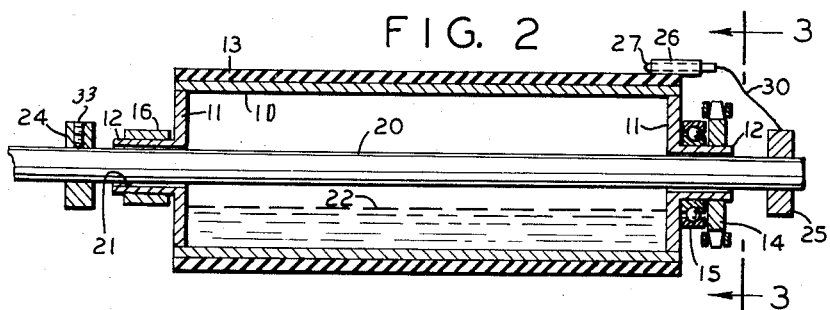
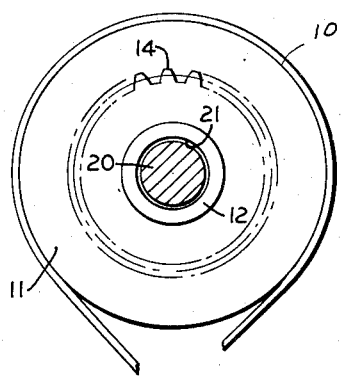
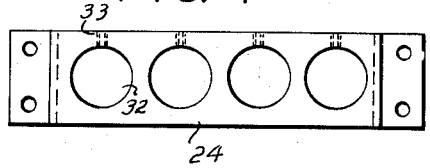
INVENTOR.
Theodore Malewski
BY John P. Chandler
his ATTORNEY.

United States Patent Office 2,831,097
Patented Apr. 15, 1958

2,831,097

HEATING ROLLER ASSEMBLY FOR LAMINATING, EMBOSSING, AND PRINTING MACHINES

Theodore Malewski, Brooklyn, N. Y.

Application February 23, 1956, Serial No. 567,277

3 Claims. (Cl. 219—19)

This invention relates to machines for operating on rolls of thermo-plastic films and relates more particularly to a heating roller assembly for machines which laminate two thermo-plastic rolls together or laminate a thermo-plastic sheet to a fabric backing and which may also perform some other operation as well such as embossing the plastic sheet and sometimes printing in the valleys formed by the embossing.

An important object of the present invention is the provision of an improved heating roller for machines of the character described and also to provide an improved heating assembly where the web to be heated will be subjected to a greater measure of heating treatment than is possible with existing machines.

Another object of the invention is to provide a heating arrangement for embossing and laminating machines for plastic films which preheats the film or films in preparation for the embossing and/or laminating rollers and which secures a more uniform heat distribution over the film than is presently possible.

A further object of the present invention is the provision of a novel heating means for a heating roller in a machine for the continuous production of welds in thermoplastic sheet materials and wherein the heat from an axially disposed electric heating element is more effectively utilized for uniformly heating the entire outer periphery of the roll. For this purpose a quantity of fluid material, preferably oil, is introduced into the shell of the roller and this oil is at all times separated from the centrally disposed electric heating element which latter, however, heats the oil and, accordingly, the outer periphery of the roller by radiation.

The heating roller assembly of the present invention may comprise a complete machine, as for use in drying rolls of dyed fabrics, or it may be used in connection with any more comprehensive machine organization where any operation is performed on webs of flexible material and wherein heat is required either before or after the principal operation has been performed.

In the drawing:

Fig. 1 shows schematically in side elevation the heating roller assembly embodying the present invention.

Fig. 2 is a central longitudinal section taken through a heating roller embodying the present invention.

Fig. 3 is a section taken on line 3—3 of Fig. 2.

Fig. 4 is a side elevation of the plate for securing the electrical heating elements against rotation.

Referring now to Figs. 2 and 3, which show the structure of each of the rollers, it will be noted that the roller comprises a cylindrical outer shell 10 having circular end plates 11 welded thereto and a central opening in each plate receives a hollow stub shaft which is welded to the end plate. The roller is provided with an outer covering 13 of resilient material which will withstand the high temperatures to which it is continuously subjected.

A chain sprocket 14 is keyed to the hollow stub shaft at one end of the roller for the purpose of turning the same by a chain drive (not shown) and the hollow shaft of this end is supported in an anti-friction bearing 15. Since there is no radial pressure exerted on the shaft at the opposite end of the roller, a simple sleeve bearing 16 is employed. Axial thrust of the roller is prevented due to the bearing race 15 being positioned between end plate 11 and sprocket 14. Clearance between the bearing 16 and the opposite end plate is necessary since the roller elongates almost 3/8 inch when heated.

The electric heating element is an elongated tubular structure 20 having an outside diameter about 1/8 inch less than the bore 21 in bearing shafts 12. Thus the heating element simply lays in the larger diameter bores in the bearing shafts and a clearance between the heating element and the bore permits the escape of gasses from the oil shown at 22 carried within the roller. The level of this oil is below the level of the bore 21 so no oil will escape from the roller during rotation.

A plate 24 is secured to the frame and is keyed at one end of the tubular heating element to prevent rotation of the latter due to the friction drive imparted by bearing shafts 12. A thermostatic element 25 for controlling operation of the heating coil is keyed to one end of the heating element and a friction shoe 26 contacts the outer periphery of the roller at a point where the thermo-plastic sheets do not engage it. This friction shoe has a thermostatic bulb 27 connected by a wire 30 to the thermostatic element. Plate 24 is shown in elevation in Fig. 4 and has a plurality of openings 32 which receive the heating elements and set-screws 33 secure the tubular elements therein. When a plurality of upper and lower heating rollers are provided in the arrangement shown in Fig. 1, two of such plates may be employed and which are secured at their terminals to the frame.

Fig. 1 illustrates the arrangement of the rollers in the heating assembly of the present invention. For the sake of clarity many of the structural elements, such as the shafts, drive sprockets, etc., are omitted. There are shown four upper and four lower rollers 10 which are suitably journalled in a frame 34. The diameters of the rollers and their relative spacing, both horizontally and vertically, is such that the web of plastic material 35 which is to be heated engages about 75% of the outer periphery except, of course, for the first and last rollers and if idlers were employed in connection with these latter rollers the same proportion of the outer periphery could be utilized.

Fig. 1 shows only one thickness of film but it will be appreciated that the two films may be joined in face-to-face engagement and thus traverse the peripheries of all the heating rollers. In fact, in some instances the two webs have earlier been joined together by a fusing operation and the machine may be used for embossing only or for embossing and printing. Thus, the manner of threading the webs of plastic or plastic and fabric backing around the heating rollers is quite flexible. In some instances four of the rollers may be used for one film and the remaining four rollers for the other. In some instances the webs may be joined part way through the heating rollers and in other instances all eight may be used for one film and none for the other.

With the heat control arrangement shown in Fig. 2 the temperature may be accurately controlled and in most instances the successive rollers will be heated to a progressively higher temperature so that when the films finally reach the pressure and/or engraved rollers they are heated to the desired temperature. The specific structure and arrangement of the latter rollers form no part of the present invention.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A heating roller for use in a machine for laminating sheets of thermo-plastic materials, said roller comprising an elongated hollow tubular shell provided with a resilient covering of heat resistant material, bearing shafts secured at the ends of the shell and provided with longitudinal bores, an elongated tubular electric heating element positioned within the bores in the shafts and having a lesser diameter than said bores, a fluid, heat transfer mass in the shell and whose level is below that of the bore, bearings for the roller and a thermostatic control contacting the roller for controlling operation of the heating coil.

2. A heating roller for use in a machine for laminating sheets of thermo-plastic materials, said roller comprising an elongated hollow tubular shell provided with a resilient covering of heat resistant material, hollow bearing shafts at the ends of the shell and end plates connecting the shafts and shell in sealed relation, an elongated tubular electric heating element positioned within the hollow shafts and having a lesser diameter than the bore in said shafts, a fluid, heat transfer mass in the shell and whose level is below that of the bore, bearings for the roller and a thermostatic control contacting the outer face of the roller for controlling operation of the heating coil.

3. A heating roller assembly for a machine for laminating rolls of thermo-plastic materials and comprising a plurality of spaced upper rollers and a plurality of spaced lower rollers over which the sheets of material travel up and down from lower to upper rollers, heating means disposed within the rollers the diameter of the heating rollers and the horizontal and vertical spacing between said rollers being such that the sheets of material engage more than 60% of the outer periphery of the rollers.

References Cited in the file of this patent

UNITED STATES PATENTS

| | | |
|---|---|---|
| 1,480,805 | Hadley et al. | Jan. 15, 1924 |
| 1,633,451 | McLaughlin et al. | June 21, 1927 |
| 1,636,359 | Gates | July 19, 1927 |
| 1,669,774 | O'Malley | May 15, 1928 |
| 1,900,166 | Dix | Mar. 7, 1933 |
| 2,127,183 | Moore | Aug. 16, 1938 |
| 2,679,572 | Workman | Mar. 25, 1954 |
| 2,680,468 | Lewis | June 8, 1954 |
| 2,721,729 | Van Riper | Oct. 25, 1955 |